United States Patent
Okuzu et al.

(10) Patent No.: US 11,326,032 B2
(45) Date of Patent: May 10, 2022

(54) POLYAMIDE FILM AND PRODUCTION METHOD FOR SAME

(71) Applicant: UNITIKA LTD., Hyogo (JP)

(72) Inventors: Takayoshi Okuzu, Kyoto (JP); Akiko Hamamoto, Kyoto (JP); Ken Akamatsu, Kyoto (JP)

(73) Assignee: Unitika Ltd., Hyogo (JP)

( * ) Notice: Subject to any disclaimer, the term of this patent is extended or adjusted under 35 U.S.C. 154(b) by 0 days.

(21) Appl. No.: 16/954,321

(22) PCT Filed: Dec. 26, 2018

(86) PCT No.: PCT/JP2018/047821
§ 371 (c)(1),
(2) Date: Jun. 16, 2020

(87) PCT Pub. No.: WO2018/131752
PCT Pub. Date: Jul. 4, 2019

(65) Prior Publication Data
US 2020/0392298 A1    Dec. 17, 2020

(30) Foreign Application Priority Data

Dec. 28, 2017 (JP) .............................. JP2017-252735

(51) Int. Cl.
*B32B 27/34* (2006.01)
*C08J 5/18* (2006.01)
*B32B 27/08* (2006.01)
*B32B 27/30* (2006.01)

(52) U.S. Cl.
CPC .............. *C08J 5/18* (2013.01); *B32B 27/08* (2013.01); *B32B 27/304* (2013.01); *B32B 27/34* (2013.01); *B32B 2307/306* (2013.01); *B32B 2307/412* (2013.01); *B32B 2307/518* (2013.01); *B32B 2307/7242* (2013.01); *B32B 2439/70* (2013.01); *B32B 2439/80* (2013.01); *C08J 2327/08* (2013.01); *C08J 2377/02* (2013.01)

(58) Field of Classification Search
CPC ...................................................... B32B 27/34
See application file for complete search history.

(56) References Cited

U.S. PATENT DOCUMENTS

| 2008/0081202 | A1 | 4/2008 | Nanba et al. |
| 2010/0279110 | A1* | 11/2010 | Kuwata ............... B32B 27/08 428/347 |
| 2017/0210105 | A1 | 7/2017 | Endo et al. |

FOREIGN PATENT DOCUMENTS

| CN | 101152764 | | 4/2008 | |
| EP | 0893463 A1 * | | 1/1999 | ............ C08L 67/025 |
| JP | 2002-127337 | | 5/2002 | |
| JP | 2003-12921 | | 1/2003 | |
| JP | 2008-94048 | | 4/2008 | |
| JP | 2010234552 A * | | 10/2010 | |
| JP | 2012-20417 | | 2/2012 | |
| JP | 2014-14976 | | 1/2014 | |
| JP | 2014-176998 | | 9/2014 | |
| JP | 2017-222087 | | 12/2017 | |
| TW | 201605628 | | 2/2016 | |
| WO | WO-2016009769 A1 * | | 1/2016 | ............ B32B 27/20 |
| WO | 2017/119446 | | 7/2017 | |
| WO | 2017/217436 | | 12/2017 | |

OTHER PUBLICATIONS

JP 2010-234552 Machine Translation (Year: 2010).*
Chinese Office Action in Chinese patent application No. 201880078001.4 dated Oct. 9, 2020 and English translation.
English language abstract and machine translation of CN 101152764.
Taiwan Office Action in Taiwan patent application No. 107147442 dated Jul. 9, 2020.
International Search Report in corresponding PCT application No. PCT/JP2018/047821, dated Apr. 9, 2019.
Japanese Office Action in application No. 2019-562100 dated Mar. 10, 2020 and English language machine translation.
English language machine translation of JP2014-14976.
English language machine translation of JP2003-12921.
English language machine translation of JP2017-222087.
English language machine translation of JP2014-176998.
English language machine translation of JP2012-20417.
English language machine translation of WO2017/119446.
English language machine translation of JP2002-127337.
English language machine translation of WO2017/217436.

* cited by examiner

*Primary Examiner* — Zachary M Davis
(74) *Attorney, Agent, or Firm* — Fildes & Outland, P.C.

(57) ABSTRACT

Provided is a polyamide film which is a stretched film including a polyamide resin composition containing 1 to 10% by mass of a polyester thermoplastic elastomer, wherein the polyamide film satisfies all of the following conditions (A) to (C): (A) elastic moduli in MD and TD of the film are each 1.0 to 2.3 GPa; (B) a ratio between the elastic moduli in MD and TD of the film (MD/TD) is 0.9 to 1.5; and (C) a haze of the film is 7% or less.

8 Claims, No Drawings

POLYAMIDE FILM AND PRODUCTION METHOD FOR SAME

TECHNICAL FIELD

The present invention relates to a film including a polyamide resin composition containing a polyester thermoplastic elastomer and a production method for the same.

BACKGROUND ART

Films including a polyamide resin such as nylon 6 or nylon 66 are excellent in mechanical properties such as tensile strength, puncture strength, pinhole strength, and impact strength, and also excellent in gas barrier properties and heat resistance. Hence, laminate films in which such a polyamide resin film as a base material and a sealant including a polyolefin film are bonded together by a method such as dry lamination or extrusion lamination are used in a wide range of fields including packaging materials for sterilization treatment such as boils or retorts.

In recent years, packaging materials have been increasingly strictly required to have performance that can maintain quality of objects to be packaged or contents without deterioration. Thus, there has been a demand for improvement in the performance. Particularly, for the contents of medicaments, foods, etc., a physical distribution system of preserving a low-temperature environment (cold chain) has been widely used for quality preservation in the processes of production, transportation, and consumption. Thus, the packaging materials have been increasingly required to improve pinhole resistance performance, particularly, in a low-temperature environment.

Examples of pinholes that are formed in the packaging materials include puncture pinholes which are formed by the piercing of a sharp corner or the like of a packaging material through another packaging material, flex pinholes which are formed by the repetitive flexion of a packaging material due to vibration or the like during transportation, and friction pinholes which are formed by the repetitive contact of a packaging material with a cardboard. The polyamide resin films are reportedly packaging materials having high pinhole resistance with less formation of these pinholes ascribable to puncture, flex, friction, etc. However, the polyamide resin films are hardened at a lower environmental temperature and therefore tend to markedly increase the number of pinholes formed due to flex.

A method of adding an olefin copolymer or a polyamide copolymer to a polyamide resin has been proposed in order to improve flex resistance in a low-temperature environment.

For example, Japanese Patent Laid-Open No. 2014-014976 discloses a polyamide resin film improved in flex resistance in a low-temperature environment by adding a ternary copolymer of ethylene, n-butyl acrylate, and maleic anhydride as an olefin copolymer. Japanese Patent Laid-Open No. 2003-012921 discloses a polyamide resin improved in flex resistance in a low-temperature environment by adding a polyether ester amide elastomer, which is a polyamide thermoplastic elastomer, as a polyamide copolymer.

However, any of the polyamide films are not sufficiently improved in flex resistance in a low-temperature environment, and cannot be used for purposes that require transparency as packaging materials due to low transparency. Thus, a packaging material that is excellent in flex resistance even in a low-temperature environment and also excellent in transparency has not yet been provided.

SUMMARY OF INVENTION

Technical Problem

The present invention overcomes the problems as described above, and an object of the present invention is to provide a polyamide film that is excellent in flex resistance even in a low-temperature environment, is suitable for use in foods of chilled distribution or medical containers such as infusion bags, and is also excellent in transparency, and production method for the same.

Solution to Problem

The present inventors have conducted studies to attain the object and consequently found that a film formed and stretched by a specific method from a polyamide resin composition containing a specific amount of a polyester thermoplastic elastomer has a specific elastic modulus and elastic modulus ratio. The present inventors have further found that such a stretched film having the specific elastic modulus and elastic modulus ratio is excellent in flex resistance in a low-temperature environment, can decrease the number of pinholes formed, and is also excellent in transparency, reaching the present invention.

Specifically, the present invention is summarized as described below.

(1) A polyamide film which is a stretched film including a polyamide resin composition containing 1 to 10% by mass of a polyester thermoplastic elastomer, wherein the polyamide film satisfies all of the following conditions (A) to (C):

(A) elastic moduli in MD and TD of the film are each 1.0 to 2.3 GPa;

(B) a ratio between the elastic moduli in MD and TD of the film (MD/TD) is 0.9 to 1.5; and (C) a haze of the film is 7% or less.

(2) The polyamide film according to (1), wherein the number of pinholes in a 1000-repetition flex fatigue test at 5° C. in a 65% RH atmosphere is 5/500 cm$^2$ or less.

(3) A polyamide laminate film including a polyamide film according to (1) or (2) and a polyvinylidene chloride resin layer on at least one surface of the polyamide film.

(4) A method for producing a polyamide film according to (1) or (2), including in order:

(a) allowing an unstretched film including a polyamide resin composition containing a polyester thermoplastic elastomer to absorb water such that a moisture percentage is 2 to 10%; and (b) biaxially stretching the unstretched film allowed to absorb water such that a MD stretch ratio (X) and a TD stretch ratio (Y) each range from 2.2 to 3.8 and a ratio between the stretch ratios (X/Y) is 0.8 to 1.2.

(5) The method for producing a polyamide film according to (4), wherein the unstretched film allowed to absorb water is biaxially stretched after preheating at 180 to 250° C.

Advantageous Effects of Invention

The polyamide film of the present invention contains a specific amount of a polyester thermoplastic elastomer and has a specific elastic modulus and elastic modulus ratio. Therefore, the polyamide film of the present invention is excellent in flex resistance in a low-temperature environment, can decrease the number of pinholes formed, and further has transparency.

Hence, the polyamide film of the present invention can suppress the formation of pinholes in a filling or distribution process in a low-temperature environment, and may be used in polyamide resin packages or containers suitable for use in foods or medical containers (e.g., infusion bags) which are distributed in a low-temperature environment.

The polyamide laminate film of the present invention has the polyamide film of the present invention and a polyvinylidene chloride resin layer on at least one surface of the polyamide film. The polyamide laminate film of the present invention has excellent gas barrier properties because of high adhesion strength between the polyamide film of the present invention and the polyvinylidene chloride resin layer.

DESCRIPTION OF EMBODIMENTS

Hereinafter, the present invention will be described in detail.

The polyamide film of the present invention is a stretched film including a polyamide resin composition containing a polyester thermoplastic elastomer. The polyamide resin layer of the polyamide film may have any of a single-layer configuration and a multilayer configuration. The single-layer configuration is superior in productivity.

Examples of the polyamide resin constituting the resin composition include nylon 6, nylon 66, nylon 46, nylon 69, nylon 610, nylon 612, nylon 1010, nylon 11, nylon 12, poly(m-xylylene adipamide) (nylon MXD6), nylon 6T, nylon 9T, nylon 10T and mixtures and copolymers thereof.

Particularly, nylon 6 is preferred in terms of productivity and performance and is excellent in cost performance. In the case of using nylon 6 as a raw material for the film, 30% by mass or less of an additional polyamide component selected from among the polyamide resins described above may be contained by a method such as copolymerization or mixing.

The polyamide resin preferably contains organic glycidyl ester, dicarboxylic anhydride, monocarboxylic acid (e.g., benzoic acid), diamine, or the like as a terminal blocking agent in order to suppress monomer production during melting.

The relative viscosity of the polyamide resin is not particularly limited. The relative viscosity measured under conditions involving a temperature of 25° C. and a concentration of 1 g/dl using 96% sulfuric acid as a solvent is preferably 1.5 to 5.0, more preferably 2.5 to 4.5, and further preferably 3.0 to 4.0. If the relative viscosity of the polyamide resin is less than 1.5, the dynamic characteristics of the resulting film tend to be markedly reduced. A polyamide resin having a relative viscosity exceeding 5.0 tends to hinder the formation of the film.

The polyamide resin can optionally contain one or two or more of various additives such as a pigment, an antioxidant, an ultraviolet absorber, an antiseptic, an antistatic agent, an antiblocking agent, and inorganic fine particles, without adversely affecting the performance of the film.

The polyamide resin may contain one or two or more of various inorganic lubricants and organic lubricants in order to improve the slip properties of the film. Examples of the lubricants include clay, talc, calcium carbonate, zinc carbonate, wollastonite, silica, alumina, magnesium oxide, calcium silicate, sodium aluminate, calcium aluminate, magnesium aluminosilicate, glass balloons, carbon black, zinc oxide, antimony trioxide, zeolite, hydrotalcite, layer silicate, and ethylenebisstearamide.

The resin composition constituting the polyamide film of the present invention needs to contain 1 to 10% by mass of the polyester thermoplastic elastomer and preferably contains 1.5 to 8% by mass, and more preferably 2 to 6% by mass of the polyester thermoplastic elastomer.

If the content of the polyester thermoplastic elastomer is less than 1% by mass, the resulting film has an elastic modulus higher than the range defined in the present invention and has poor flex resistance in a low-temperature environment.

If the content of the polyester thermoplastic elastomer exceeds 10% by mass, the resulting film has an elastic modulus lower than the range defined in the present invention, and rarely exhibits improvement in flex resistance in a low-temperature environment depending on the content of the polyester thermoplastic elastomer while transparency is reduced. Furthermore, puncture strength or abrasion resistance, which influences the pinhole resistance of the polyamide film, is also reduced.

The polyester thermoplastic elastomer according to the present invention is preferably constituted by a crystalline polymer segment including a crystalline aromatic polyester unit, and a polymer segment including an aliphatic polyether unit, as main components.

The crystalline polymer segment including a crystalline aromatic polyester unit is a unit including crystalline aromatic polyester formed from aromatic dicarboxylic acid or an ester-forming derivative thereof and aliphatic diol, and is preferably a polybutylene terephthalate unit derived from terephthalic acid and/or dimethyl terephthalate and 1,4-butanediol.

Alternatively, the polyester unit may be a polyester unit derived from a dicarboxylic acid component such as terephthalic acid, isophthalic acid, phthalic acid, naphthalene-2,6-dicarboxylic acid, naphthalene-2,7-dicarboxylic acid, diphenyl-4,4'-dicarboxylic acid, diphenoxyethanedicarboxylic acid, 5-sulfoisophthalic acid, or an ester-forming derivative thereof, and diol having a molecular weight of 300 or lower, for example, aliphatic diol such as 1,4-butanediol, ethylene glycol, trimethylene glycol, pentamethylene glycol, hexamethylene glycol, neopentyl glycol, or decamethylene glycol, alicyclic diol such as 1,4-cyclohexanedimethanol or tricyclodecane dimethylol, or aromatic diol such as xylylene glycol, bis(p-hydroxy)diphenyl, bis(p-hydroxyphenyl) propane, 2,2-bis[4-(2-hydroxyethoxy)phenyl]propane, bis[4-(2-hydroxy)phenyl]sulfone, 1,1-bis[4-(2-hydroxyethoxy)phenyl]cyclohexane, 4,4'-dihydroxy-p-terphenyl, or 4,4'-dihydroxy-p-quaterphenyl, or a copolymerized polyester unit containing two or more of these dicarboxylic acid components and diol components in combination. A trifunctional or higher polyfunctional carboxylic acid component, a polyfunctional oxyacid component and a polyfunctional hydroxy component, etc. may be copolymerized with these components in the range of 5% by mol or less.

The polymer segment including an aliphatic polyether unit is a unit composed mainly of aliphatic polyether. Specific examples of the aliphatic polyether include poly(ethylene ether) glycol, poly(propylene ether) glycol, poly(tetramethylene ether) glycol, poly(hexamethylene ether) glycol, copolymers of ethylene oxide and propylene oxide, ethylene oxide addition polymers of poly(propylene ether) glycol, and copolymers of ethylene oxide and tetrahydrofuran.

Among these aliphatic polyethers, poly(tetramethylene ether) glycol is preferred because the resulting polyester block copolymer has favorable elastic characteristics. The number-average molecular weight of this polymer segment is preferably on the order of 300 to 6000 in a copolymerized state.

The content of the polymer segment including an aliphatic polyether unit in the polyester thermoplastic elastomer is preferably 10 to 80% by mass, and more preferably 15 to 75% by mass. If the content of the polymer segment is less than 10% by mass, the resulting resin composition tends to be hard. When the content exceeds 80% by mass, the resin composition may be too soft to exert physical properties.

The polyester thermoplastic elastomer can be produced by a method usually used. Any method is used, for example, a method of performing transesterification reaction of lower alcohol diester of dicarboxylic acid, an excessive amount of low-molecular-weight glycol and the components constituting the polymer segment in the presence of a catalyst, and polycondensing the resulting reaction product, a method of performing esterification reaction of dicarboxylic acid, an excessive amount of glycol and the components constituting the polymer segment in the presence of a catalyst, and polycondensing the resulting reaction product, and a method of adding the polymer segment components to the crystalline segment prepared in advance, and performing transesterification reaction for randomization.

Examples of commercially available products of the polyester thermoplastic elastomer include "Primalloy AP" manufactured by Mitsubishi Chemical Corp., "Pelprene" manufactured by Toyobo Co., Ltd., and "Hytrel" manufactured by Du Pont-Toray Co., Ltd.

The elastic moduli in MD (machine direction) and TD (transverse direction) of the polyamide film of the present invention need to each be 1.0 to 2.3 GPa, and the ratio between the elastic moduli in MD and TD (MD/TD) needs to be 0.9 to 1.5. The polyamide film of the present invention having each of the elastic moduli in MD and TD and the elastic modulus ratio that satisfies the ranges described above is capable of improving flex resistance in a low-temperature environment and can be excellent in transparency.

In general, flex resistance as well as characteristics of puncture strength and abrasion resistance are important for reducing the formation of pinholes in polyamide films. The polyamide film of the present invention also has both of excellent puncture strength and abrasion resistance unique to polyamide films and therefore exhibits excellent pinhole resistance even in a low-temperature environment.

The elastic moduli in MD and TD of the polyamide film of the present invention need to be 1.0 to 2.3 GPa, as described above, and are preferably 1.2 to 2.1 GPa, and more preferably 1.4 to 1.9 GPa. If the elastic modulus is lower than 1.0 GPa, the resulting polyamide film has poor flex resistance in a low-temperature environment or poor transparency. Furthermore, puncture strength or abrasion resistance is also reduced. If the elastic modulus is higher than 2.3 GPa, the resulting polyamide film, even if containing a polyester elastomer in the range defined in the present invention, has poor flex resistance in a low-temperature environment or poor transparency.

The ratio between the elastic moduli in MD and TD (MD/TD) of the polyamide film of the present invention needs to be 0.9 to 1.5, as described above, and is preferably 1.0 to 1.4, and more preferably 1.1 to 1.35. If the elastic modulus ratio falls outside the range defined in the present invention, flex resistance in a low-temperature environment or transparency is poor. Furthermore, puncture strength or abrasion resistance is also reduced.

The production of the polyamide film having the elastic modulus and the elastic modulus ratio defined in the present invention is achieved by a method for producing the film of the present invention mentioned later.

The haze which is a characteristic value indicating the transparency of the polyamide film of the present invention needs to be 7% or less and is preferably 5% or less, and more preferably 3.3% or less. A polyamide film having a haze exceeding 7% is difficult to use for purposes that require transparency. Furthermore, a polyamide film having a haze exceeding 7% may have an insufficiently dispersed state of the polyester thermoplastic elastomer or may have undergone insufficient preheating before stretching during film production. In short, the elastic modulus may exceed the range defined in the present invention, or the flex resistance in a low-temperature environment may be reduced.

The flex resistance in a low-temperature environment of the polyamide film of the present invention is evaluated on the basis of the number of pinholes in a 1000-repetition flex fatigue test at 5° C. in a 65% RH atmosphere using Gelbo Flex Tester. This number of the polyamide film of the present invention is preferably $5/500$ $cm^2$ or less, and more particularly preferably $3.5/500$ $cm^2$ or less. A polyamide film having the number of pinholes exceeding $5/500$ $cm^2$ disadvantageously has insufficient strength in the form of a package or may leak liquid contents due to pinholes resulting from flex fatigue in a low-temperature environment.

As described above, the polyamide film of the present invention is also excellent in puncture strength and abrasion resistance, characteristics that influence pinhole resistance in a low-temperature environment.

First, the puncture strength in a low-temperature environment of the polyamide film of the present invention is evaluated on the basis of puncture strength at 5° C. in a 65% RH atmosphere. This strength of the polyamide film of the present invention per µm is preferably 0.60 N/µm or higher, and more preferably 0.65 N/µm or higher. A polyamide film having puncture strength lower than 0.60 N/µm may be difficult to use for purposes that require pinhole resistance.

The abrasion resistance in a low-temperature environment of the polyamide film of the present invention is evaluated on the basis of the number of slides leading to pinhole formation by repetitive contact at 5° C. in a 65% RH atmosphere using a Gakushin-type rubbing tester. This number of the polyamide film of the present invention is preferably 200 or higher, and more preferably 250 or higher. If the number of slides leading to pinhole formation is lower than 200, the resulting polyamide film may be difficult to use for purposes that require pinhole resistance.

The thickness of the polyamide film of the present invention is preferably 10 to 50 µm for use for packaging purposes.

Next, a method for producing the polyamide film of the present invention will be described.

The polyamide film of the present invention can be produced by: molding a melt-kneaded product containing a polyamide resin and a polyester thermoplastic elastomer into a sheet to obtain an unstretched film; then allowing the unstretched film to absorb water at a specific moisture percentage; and then stretching the unstretched film allowed to absorb water at specific MD and TD ratios and a specific ratio between the MD and TD ratios.

First, a polyamide resin and a polyester thermoplastic elastomer are melt-kneaded to produce a polyamide resin composition.

An extruder for use in the melt kneading may be any of a single-screw extruder having one screw in a cylinder and a multi-screw extruder having a plurality of screws. For charging the polyester thermoplastic elastomer and the polyamide resin into the cylinder, it is preferred to charge these resins at the same time from near the inlet of the cylinder. Alternatively, the polyamide resin may be charged from near the inlet of the cylinder, and then, the polyester thermoplastic elastomer can be charged from the path of the cylinder.

In any of the cases, it is preferred to perform the melt kneading by setting a cylinder temperature at the start of kneading immediately after charging of both the resins to 180 to 200° C., and setting a cylinder temperature near the outlet of the composition containing both the resins thus kneaded to (the melting point of the polyamide resin+10° C.) to (the melting point of the polyamide resin+30° C.).

The melt kneading at such temperature settings improves the dispersibility of the polyester thermoplastic elastomer added into the polyamide resin.

If the cylinder temperature at the start of kneading is lower than 180° C., the polyamide resin is insufficiently kneaded with the polyester thermoplastic elastomer due to a shift of melting to the second half of the cylinder so that the dispersed particle size of the polyester thermoplastic elastomer is large. The resulting film may have insufficient flex resistance or may have an elevated haze. If the cylinder temperature at the start of kneading exceeds 200° C., the polyester thermoplastic elastomer starts to be melted from immediately after charging and twines around the cylinder. This destabilizes the extrusion of the polyamide resin. Thus, an unstretched film having a uniform film thickness may be difficult to collect.

If the cylinder temperature near the outlet of the composition containing both the resins thus kneaded is lower than (the melting point of the polyamide resin+10° C.), an unmelted polyamide resin may be present. Thus, the unstretched film may be difficult to collect continuously. If the cylinder temperature near the outlet exceeds (the melting point of the polyamide resin+30° C.), the unstretched film may be difficult to collect continuously due to the thermal decomposition of the polyamide resin or the polyester thermoplastic elastomer.

Next, the resin composition containing both the resins is melted by heating in an extruder and extruded into a film through a T die. The extrudate is cooled for solidification on a rotating cooling drum by a known casting method such as an air knife casting method or a static casting method to form an unstretched film.

The average thickness of the unstretched film is not particularly limited and is generally on the order of 15 to 500 μm, and preferably 50 to 300 μm. More efficient stretching can be carried out by setting the average thickness to within such a range.

The production method of the present invention needs to include (a) allowing the obtained unstretched film to absorb water such that a moisture percentage is 2 to 10% by mass.

The unstretched film before water absorption usually has a moisture percentage of 0.1% by mass. In the related art, the stretching is carried out for the unstretched film having such a moisture percentage. By contrast, in the present invention, the moisture percentage is adjusted to the range described above by adding moisture to the unstretched film.

Specifically, in the present invention, the moisture percentage of the unstretched film needs to be 2 to 10% by mass, as described above, and is particularly preferably 3.5 to 8.5% by mass. When the moisture percentage of the unstretched film is less than 2% by mass, stress is high during stretching due to a small amount of moisture serving as a plasticizer. Hence, a large void or many voids occur between the polyamide resin and the dispersed polyester thermoplastic elastomer particles in the film. Thus, the haze of the film is elevated, or the film is frequently cut. When the moisture percentage exceeds 10% by mass, the unstretched film has large thickness unevenness. Thus, the stretched film obtained by stretching also has large thickness unevenness and has poor flex resistance.

A method for adjusting the moisture percentage is not particularly limited as long as the method can increase the moisture percentage of the unstretched film. The method may be any of, for example, a method of spraying water or water vapor to the unstretched film, a method of applying water to the unstretched film using a roller, and a method of dipping the unstretched film in water. For example, a method of dipping the unstretched film in a water tank for a given time can be suitably adopted.

The water for use in the adjustment of the moisture percentage may be any of pure water, tap water, and the like and is not particularly limited. An additional component may be dispersed or dissolved in the water without interfering with the advantageous effects of the present invention. The pH of the water for use in the adjustment of the moisture percentage is preferably 6.5 to 9.0.

The temperature of the water is preferably 20 to 70° C., more preferably 30 to 65° C., and further preferably 40 to 55° C. If the temperature of the water is lower than 20° C., it may be difficult to adjust the moisture percentage in a short time. If the temperature of the water exceeds 70° C., the unstretched film is easily wrinkled and nonuniformly stretched to reduce the quality of the stretched film. Furthermore, troubles such as cutting of the film or failure in gripping of a film end portion easily arise and reduce operability during stretching.

The time for which the unstretched film is dipped in a water tank is preferably 0.5 to 10 minutes.

The unstretched film allowed to absorb water such that a moisture percentage is 2 to 10% by mass is preferably preheated prior to stretching. The preheating temperature is preferably 180 to 250° C., more particularly preferably 190 to 240° C., and further preferably 200 to 230° C.

If the preheating temperature is lower than 180° C., the unstretched film is less likely to obtain a film temperature necessary for stretching. Therefore, stretching stress is high and rapidly peels the polyamide resin closely attached to the polyester thermoplastic elastomer. Thus, a large void or many voids may occur in the film. Hence, the void ratio may be high, and the haze may be elevated. Furthermore, neck stretch may occur, a bowing phenomenon may be conspicuous, or cutting may occur frequently.

If the preheating temperature exceeds 250° C., the evaporation rate of moisture absorbed to the unstretched film is fast. Hence, the film temperature is too high to molecularly orient the film by draw-stretched. Therefore, the resulting stretched film easily has thickness unevenness and easily has poor flex resistance.

A method for preheating the unstretched film is also not limited. The preheating is preferably performed, for example, by setting the temperature of hot air to be blown to the film travelling in a preheating zone of a stretching machine to the temperature range described above. The time for which the unstretched film travels in a preheating zone (preheating time) is preferably 0.5 to 5 seconds.

Next, the unstretched film thus allowed to absorb water is stretched.

A stretching method is not particularly limited, and any of, for example, a tubular method, a tenter-type simultaneous biaxial stretching method, and a tenter-type sequential biaxial stretching method are applicable. The tubular method is advantageous in more inexpensive installation cost of apparatuses than that of the other methods, but has the difficulty in enhancing the thickness accuracy of the film. The tenter-type biaxial stretching methods are superior in quality stability, dimensional stability, and productivity. Thus, the tenter-type biaxial stretching methods are preferred for the method for producing the polyamide film of the present invention. Particularly, the tenter-type simultaneous biaxial stretching method tends to decrease variations or distortion of values of physical properties between central and end portions of the film, and is therefore preferred for the method for producing the film having the elastic modulus and the elastic modulus ratio defined in the present invention.

Stretching stress can be suppressed by stretching and heat fixation treatments after adjustment of the moisture percentage of the unstretched film to the specific one as described above. This permits stretching without peeling the polyamide resin closely attached to the polyester thermoplastic elastomer due to stretching stress, and can effectively suppress or prevent the occurrence of a large void or many voids in the film.

The production method of the present invention needs to include (b) biaxially stretching the unstretched film allowed to absorb water as described in (a) such that a stretch ratio in the machine direction (MD stretch ratio, X) and a stretch ratio in the transverse direction (TD stretch ratio, Y) each range from 2.2 to 3.8 and a ratio between the stretch ratios (X/Y) is 0.8 to 1.2. Each of X and Y is preferably 2.3 to 3.7, and X/Y is preferably 0.9 to 1.1.

If any of X and Y are less than 2.2, the unstretched film is not sufficiently stretched. Therefore, the oriented crystallization of the resulting stretched film does not sufficiently proceed, resulting in a low elastic modulus and large thickness unevenness. The resulting film has poor flex resistance and may have poor impact strength, tensile strength, tensile elongation, or the like. If any of X and Y exceed 3.8, the oriented crystallization of the film proceeds too much. The resulting stretched film tends to have a high elastic modulus, and the film is easily cut during stretching.

If the ratio between the stretch ratios (X/Y) falls outside the range described above, the obtained stretched film tends to have large anisotropy of an elastic modulus. Thus, flex resistance or abrasion resistance is reduced.

The product of the stretch ratios (X×Y) is preferably 8.5 to 11.0, and more preferably 9.0 to 10.0. If the product of the stretch ratios (X×Y) is less than 8.5, the resulting stretched film may have a low elastic modulus. Thus, abrasion resistance may be reduced. If the product of the stretch ratios (X×Y) exceeds 11.0, the resulting stretched film may have a high elastic modulus. Thus, flex resistance may be reduced.

The stretching temperature is preferably 170 to 230° C., and more preferably 180° C. to 220° C. If the stretching temperature is lower than 170° C., the unstretched film is less likely to obtain a film temperature necessary for stretching. Therefore, stretching stress is high and reduces the physical characteristics, such as flex resistance or impact strength, of the stretched film. Furthermore, cutting occurs frequently. If the stretching temperature exceeds 230° C., the film temperature is too high to molecularly orient the film by draw-stretched. Therefore, the physical characteristics, such as impact strength, of the resulting stretched film are reduced.

The film thus biaxially stretched is preferably heat-fixed at a temperature of 150 to 220° C. in the tenter where the stretching treatment has been performed, and subjected, if necessary, to relaxation treatment in MD and/or TD in the range of 0 to 10%, and preferably 2 to 6%.

For the polyamide film of the present invention, a functional layer such as a gas barrier coat layer or a sealant layer may be laminated on at least one surface. A resin constituting the gas barrier coat layer is not particularly limited and is preferably a polyvinylidene chloride resin (PVDC).

The polyamide laminate film of the present invention includes the polyamide film of the present invention and a PVDC layer on at least one surface of the polyamide film. PVDC is obtained as a latex dispersed in a medium by polymerizing 50 to 99% by mass of vinylidene chloride as a raw material with 1 to 50% by mass of one or more additional monomers copolymerizable with vinylidene chloride by a known emulsion polymerization method. The average particle size of PVDC in the latex is preferably 0.05 to 0.5 μm, and particularly preferably 0.07 to 0.3 μm. PVDC may be used in combination with various additives, for example, an antiblocking agent and an antistatic agent, without impairing the advantageous effects of the present invention.

The thickness of the PVDC layer is preferably 0.5 to 3.5 μm, more preferably 0.7 to 3.0 μm, and further preferably 1.0 to 2.5 μm. If the thickness of the PVDC layer is smaller than 0.5 μm, gas barrier properties are not sufficiently obtained. If the thickness of the PVDC layer exceeds 3.5 μm, film formability is reduced so that the appearance of a coating is easily impaired. Furthermore, a thicker PVDC layer tends to harden the laminate film. Therefore, pinholes are easily formed due to flex in a low-temperature environment.

The adhesion strength between the polyamide film and the PVDC layer in the polyamide laminate film is preferably 0.8 N/cm or more, more preferably 1.0 N/cm or more, and further preferably 2.0 N/cm or more. If the adhesion strength is less than 0.8 N/cm, the polyamide laminate film may separate between the polyamide film and the PVDC layer during boil treatment or retort treatment or may not produce sufficient sealing strength.

A large amount of the monomer or a large content of the polyester thermoplastic elastomer in the polyamide film may reduce the adhesion strength between the polyamide film and the PVDC layer.

The PVDC layer is preferably formed on the polyamide film at a stage where the amount of the monomer is small after moisture percentage adjustment and before stretching. This improves the adhesion strength to the polyamide film.

In order to laminate the PVDC layer on the polyamide film, a method for applying the PVDC latex thereto is not particularly limited, and a usual method such as gravure roll coating, reverse roll coating, wire bar coating, air knife coating, die coating, or curtain die coating can be used.

The polyamide film may be subjected to corona discharge treatment or the like immediately before the application.

The thickness of the polyamide laminate film preferably ranges from 10 to 30 μm for use for packaging purposes.

The polyamide laminate film of the present invention including the polyamide film and the PVDC layer laminated with each other is excellent in pinhole resistance in a low-temperature environment and in addition, has excellent gas barrier properties and excellent adhesiveness between the polyamide film and the PVDC layer. Therefore, the polyamide laminate film of the present invention can be suitably used as a packaging material.

EXAMPLES

Next, the present invention will be specifically described with reference to Examples. Methods for evaluating various physical properties in Examples and Comparative Examples given below are as described below.

<Relative Viscosity>

Pellets of a polyamide resin were dissolved at a concentration of 1 g/dl in 96% sulfuric acid. The relative viscosity was measured under conditions involving a temperature of 25° C.

<Moisture Percentage>

An unstretched film was collected before stretching, placed in a weighing bottle, and then dried at 150° C. for 20 hours. The moisture percentage was calculated from change in mass between before and after the drying.

<Operability>

The state of an unstretched film passing through a water tank was visually observed to determine the status of occurrence of wrinkling, meandering, etc. The operability was evaluated on a scale of "G (good)", "F (fair)", and "P (poor)" as described below. A sample given "G (good)" or "F (fair)" passed.

G: Neither wrinkling nor meandering, etc. occurred in the travelling unstretched film.

F: Wrinkling, meandering, etc. occurred in the travelling unstretched film, albeit stretchable.

P: Wrinkling, meandering, etc. occurred frequently in the travelling unstretched film, and the stretched film was frequently cut.

<Elastic Modulus and Elastic Modulus Ratio>

The obtained polyamide film or polyamide laminate film was left for 2 hours in an environmental test laboratory adjusted to 23° C. and 50% RH. Then, the film was cut into strips of 300 mm in the measurement directions of MD and TD (distance between marked lines: 250 mm) and 15 mm in directions perpendicular to the measurement directions to obtain samples. A tensile test was conducted at a testing rate of 500 mm/min using a tensile tester (AG-IS manufactured by Shimadzu Corp.) equipped with a load cell for 1 kN measurement and a sample chuck. The elastic moduli were calculated from the gradient of a load-elongation curve, and the elastic modulus ratio (MD/TD) was calculated. The measurement was performed at n=5, and each average value was calculated.

<Haze>

The total haze was measured in accordance with ASTM D1003-61 using a haze meter manufactured by Tokyo Denshoku Co., Ltd. The measurement was performed at n=3, and an average value was calculated.

<Flex Resistance (Pinhole Resistance—1) (Flex Fatigue Test)>

The obtained polyamide film or polyamide laminate film was left for 2 hours in an environmental test laboratory adjusted to 5° C. and 65% RH. Then, a flex fatigue test (twisting angle: 440°) was conducted 1000 times using Gelbo Flex Tester (manufactured by Tester Sangyo Co., Ltd., BE-1005). The number of pinholes in the film sample (distance between chucks: 178 mm, diameter: 89 mm) was determined by counting the number of penetration sites of ink on a filter paper. The measurement was performed at n=3, and an average value of the numbers of pinholes per 500 $cm^2$ was calculated.

<Puncture Strength (Pinhole Resistance—2)>

The obtained polyamide film or polyamide laminate film was left for 2 hours in an environmental test laboratory adjusted to 5° C. and 65% RH. Then, the film was fixed in a state of tension in a round form having an inside diameter of 100 mm. A needle having a curvature radius of 0.5 mm at the point was put perpendicularly to the sample surface at a rate of 50 mm/min and allowed to pierce a central portion of this sample. The strength was measured when the film was broken. The measurement was performed at n=5, and an average value of strengths per μm of film thickness was calculated.

<Abrasion Resistance (Pinhole Resistance—3)>

The obtained polyamide film or polyamide laminate film was left for 2 hours in an environmental test laboratory adjusted to 5° C. and 65% RH. Then, the film was folded into four. In a Gakushin-type rubbing tester, the vertex of the folded film was vertically contacted with a pasteboard having a basis weight of 400 g/$m^2$. Then, a load of 50 g was applied to the film, which was then fixed to a jig. The pasteboard was slid under conditions involving 120 mm in the longitudinal direction of the folded film and 30 times/min. The number of slides leading to pinhole formation was counted. The test was conducted at n=3, and pinhole formation was confirmed every 20 slides. The abrasion resistance was evaluated on the basis of the number of slides when pinholes were formed in all the samples. For example, the abrasion resistance was evaluated as 400 times when pinholes were formed in all the 3 samples with the number of slides of 400 times and formed in 2 out of the 3 samples with the number of slides of 380 times.

The presence or absence of a formed pinhole was determined by adding dropwise ethyl acetate to the vertex of the folded film contacted with the pasteboard, and examining the presence or absence of ethyl acetate penetration onto a white sheet.

<Thickness Unevenness>

The thickness was measured every 10 cm along the transverse direction of the polyamide film over the total width using a 0 ray transmission-type thickness gauge. The thickness unevenness was calculated according to the expression given below, and evaluated on a scale of "G (good)", "F (fair)", and "P (poor)" as described below. A sample given "G (good)" or "F (fair)" passed.

Thickness unevenness=(Maximum thickness along the transverse direction−Minimum thickness along the transverse direction)/Average thickness×100

G: 10% or less
F: More than 10% and 15% or less
P: More than 15%

<Oxygen Permeability>

The gas barrier properties were evaluated by measuring the oxygen permeability of the polyamide laminate film at a temperature of 20° C. in an 85% RH atmosphere using an oxygen barrier measurement instrument manufactured by MOCON, Inc. (OX-TRAN 2/20). The measurement was performed at n 2, and an average value was calculated. A sample having oxygen permeability of less than 110 ml/($m^2$·d·MPa) passed.

<Adhesion Strength>

A urethane adhesive (manufactured by DIC Corp., DICDRY LX-401A/SP-60) was applied in an amount of dry coating of 3.0 g/$m^2$ to the surface of the PVDC layer of the polyamide laminate film, and then heat-treated at 80° C. Then, an unstretched polyethylene film (manufactured by Mitsui Chemicals Tohcello Inc., T.U.X FCS, 50 μm) was dry-laminated to the surface of the adhesive thus heat-treated, at a nip pressure of 490 kPa on a metal roll heated to 80° C. Aging recommended for the adhesive was further carried out to obtain a laminate film.

A test specimen having a width of 15 mm was collected from the obtained laminate film. The interface between the polyethylene film and the PVDC layer was peeled at an end portion of the test specimen at 20° C. in a 65 RH atmosphere. Then, the laminate strength was measured at a pulling rate of 300 mm/min using a tensile tester (AGS- 100G manufactured by Shimadzu Corp.) such that the polyethylene film and the polyamide laminate film assumed a T shape.

In this laminate strength measurement, the peeling should occur at the interface between the PVDC layer and the polyamide film or at the interface between the polyethylene film and the PVDC layer. In the absence of delamination between the polyamide film and the PVDC layer in the sample after the strength measurement, the delamination strength between the polyamide film and the PVDC layer is regarded as having at least a value equal to or larger than this measurement value. A sample having adhesion strength of 0.8 N/cm or more passed.

Raw materials used in Examples and Comparative Examples are as described below.

[Polyamide Resin]

A closed reaction container equipped with a stirrer was charged with 100 parts by mass of ε-caprolactam, 0.12 parts by mass of benzoic acid (10 mmol/kg with respect to ε-caprolactam), and 3 parts by mass of water, and warmed. Polycondensation reaction was performed at a temperature of 260° C. at a pressure of 0.5 MPa. The reaction product was taken out of the reaction container and then cut into chips, which were then refined and dried to obtain a polyamide resin. The relative viscosity of the chips of this polyamide resin was 3.03.

[Master Chip]

100 parts by mass of the polyamide resin and 6 parts by mass of silica fine particles (Syloid SY-150 manufactured by Mizusawa Industrial Chemicals, Ltd.) were melt-mixed to prepare master chips.

[Polyester Thermoplastic Elastomer]

Primalloy: Primalloy AP GQ131 manufactured by Mitsubishi Chemical Corp.

Hytrel: Hytrel 5577 manufactured by Du Pont-Toray Co., Ltd.

[Polyamide Thermoplastic Elastomer]

PEBAX: PEBAX 3533 manufactured by Arkema [Olefin copolymer]

Rexpearl: Rexpearl ET230X manufactured by Japan Polyethylene Corp.

Example 1

The polyamide resin, the polyester thermoplastic elastomer Primalloy, and the master chips were blended such that the content of Primalloy was 5.0% by mass and the content of inorganic fine particles was 0.05% by mass. The blend was charged into an extruder, melted in a cylinder heated to a temperature of 190° C. at the start of kneading and a cylinder outlet temperature of 230° C., and extruded into a sheet from a T die orifice. The extrudate was closely attached for quenching to a rotary drum cooled to 10° C. to obtain an unstretched film having a thickness of 250 μm.

Next, this unstretched film was led to a water tank set to pH 7.9 and a temperature of 53° C. for moisture percentage adjustment, and dipped in water for 1 minute and thereby allowed to absorb water such that the moisture percentage of the film was 6.3% by mass.

Next, the unstretched film allowed to absorb water was led to a simultaneous biaxial stretching machine, subjected to preheating treatment at 210° C. for 2 seconds, and then simultaneously biaxially stretched at a MD stretch ratio (X) of 3.0 and a TD stretch ratio (Y) of 3.3 at 195° C. for 2 seconds. Subsequently, heat fixation treatment was performed at a temperature of 220° C. for 5 seconds, followed by 5% relaxation treatment in the lateral direction to obtain a polyamide film having a thickness of 25 μm.

Examples 2 to 15 and Comparative Examples 1 and 3 to 14

Each polyamide film having a thickness of 25 μm was obtained in the same way as in Example 1 except that the type and content of the elastomer and the production conditions for the film were changed as described in Table 1.

In Example 11, the moisture percentage adjustment conditions were changed while the unstretched film allowed to absorb water was subjected to drying treatment at 80° C. for 30 seconds using an infrared irradiation machine to adjust the moisture percentage of the unstretched film to 2.8% by mass. In Examples 12 and 13 and Comparative Example 14, the thickness of the unstretched film was changed in association with change in the stretch ratio of the unstretched film to obtain a polyamide film having a thickness of 25 μm. In Example 14, the thickness of the unstretched film was set to 150 μm to obtain a polyamide film having a thickness of 15 μm. In Comparative Example 8, the polyamide film was obtained without moisture percentage adjustment. In Comparative Example 9, the unstretched film allowed to absorb water was subjected to drying treatment at 110° C. for 30 seconds using an infrared irradiation machine to adjust the moisture percentage of the unstretched film to 1.2% by mass.

Example 16

An unstretched film having a thickness of 250 μm was obtained in the same way as in Example 1.

Next, this unstretched film was led to a water tank set to pH 7.9 and a temperature of 53° C. for moisture percentage adjustment, dipped in water for 1 minute, and then subjected to drying treatment for 30 seconds using an infrared irradiation machine having a temperature of 80° C. to prepare an unstretched film having a film moisture percentage of 2.8% by mass.

Next, the unstretched film allowed to absorb water was longitudinally stretched at a MD stretch ratio (X) of 2.8 at 55° C. using a MD stretching machine having heating rollers differing in circumferential velocity.

Next, this longitudinally stretched film was subjected to preheating treatment at 180° C. for 1 second, and then laterally stretched at a TD stretch ratio (Y) of 3.5 at 180° C. for sequential stretching treatment.

Then, the temperature was gradually elevated in the tenter, and the film was heat-treated at the highest achieving temperature of 210° C. and further relaxed by 2% in TD at 210° C. Then, the film was cooled at 100° C. to obtain a polyamide film having a thickness of 25 μm.

Comparative Example 2

A polyamide film having a thickness of 25 μm was obtained in the same way as in Example 16 except that Primalloy was not added.

Comparative Example 15

A polyamide film having a thickness of 25 μm was obtained in the same way as in Example 16 except that the MD stretch ratio (X) was changed to 3.0 and the TD stretch ratio (Y) was changed to 4.0.

The configurations, production conditions, and evaluation results of the polyamide films obtained in Examples 1 to 16 and Comparative Examples 1 to 15 are shown in Table 1.

TABLE 1

| | | Elastomer of polyamide resin composition | | | Moisture percentage adjustment | | Moisture percentage of film before stretching (% by mass) | Pre-heating temperature (°C) | Stretching method | Stretch ratio | | | | Operability | Elastic modulus (GPA) | | | Haze (%) | Pinhole resistance (5° C., 65% RH) | | Puncture strength (N/μm) | Abrasion resistance (times) | Thickness unevenness |
|---|---|---|---|---|---|---|---|---|---|---|---|---|---|---|---|---|---|---|---|---|---|---|---|
| | | Type | Content (% by mass) | pH | Temperature (°C) | Time (min) | | | | X (MD) | Y (TD) | X/Y | X × Y | | MD | TD | MD/TD | | Flex resistance | (the number of pinholes) | | | |
| Example | 1 | Primalloy | 5.0 | 7.9 | 53 | 1.0 | 6.3 | 210 | Simultaneous | 3.0 | 3.3 | 0.91 | 9.9 | G | 1.65 | 1.28 | 1.29 | 3.0 | | 0.7 | 0.68 | 300 | G |
| | 2 | Primalloy | 1.0 | 7.9 | 53 | 1.0 | 6.0 | 210 | Simultaneous | 3.0 | 3.3 | 0.91 | 9.9 | G | 2.12 | 1.90 | 1.12 | 2.7 | | 4.3 | 0.70 | 360 | G |
| | 3 | Primalloy | 3.0 | 7.9 | 53 | 1.0 | 6.2 | 210 | Simultaneous | 3.0 | 3.3 | 0.91 | 9.9 | G | 1.80 | 1.55 | 1.16 | 3.0 | | 0.7 | 0.70 | 340 | G |
| | 4 | Primalloy | 8.0 | 7.9 | 53 | 1.0 | 6.2 | 210 | Simultaneous | 3.0 | 3.3 | 0.91 | 9.9 | G | 1.42 | 1.13 | 1.26 | 4.5 | | 0.3 | 0.65 | 220 | G |
| | 5 | Hytrel | 5.0 | 8.5 | 53 | 1.0 | 6.0 | 210 | Simultaneous | 3.0 | 3.3 | 0.91 | 9.9 | G | 1.85 | 1.51 | 1.23 | 2.8 | | 3.3 | 0.63 | 300 | G |
| | 6 | Hytrel | 8.0 | 6.8 | 53 | 1.0 | 6.2 | 210 | Simultaneous | 3.0 | 3.3 | 0.91 | 9.9 | G | 1.72 | 1.31 | 1.31 | 3.3 | | 1.7 | 0.60 | 260 | G |
| | 7 | Primalloy | 5.0 | 7.9 | 53 | 8.0 | 8.5 | 210 | Simultaneous | 3.0 | 3.3 | 0.91 | 9.9 | G | 1.42 | 1.09 | 1.30 | 2.2 | | 3.3 | 0.67 | 300 | G |
| | 8 | Primalloy | 5.0 | 7.9 | 68 | 0.5 | 7.4 | 210 | Simultaneous | 3.0 | 3.3 | 0.91 | 9.9 | G | 1.60 | 1.20 | 1.33 | 2.3 | | 1.0 | 0.69 | 240 | F |
| | 9 | Primalloy | 5.0 | 7.9 | 30 | 1.0 | 6.4 | 210 | Simultaneous | 3.0 | 3.3 | 0.91 | 9.9 | G | 1.71 | 1.30 | 1.32 | 3.1 | | 0.7 | 0.69 | 260 | G |
| | 10 | Primalloy | 5.0 | 7.9 | 53 | 1.0 | 5.8 | 210 | Simultaneous | 3.0 | 3.3 | 0.91 | 9.9 | G | 1.60 | 1.30 | 1.23 | 2.1 | | 0.3 | 0.70 | 240 | G |
| | 11 | Primalloy | 5.0 | 7.9 | 25 | 3.0 | 2.8 | 210 | Simultaneous | 3.0 | 3.3 | 0.91 | 9.9 | G | 2.01 | 1.82 | 1.10 | 5.5 | | 3.7 | 0.69 | 280 | G |
| | 12 | Primalloy | 5.0 | 7.9 | 53 | 1.0 | 5.5 | 210 | Simultaneous | 3.1 | 2.8 | 1.11 | 8.7 | G | 1.63 | 1.22 | 1.34 | 2.5 | | 3.3 | 0.73 | 220 | F |
| | 13 | Primalloy | 5.0 | 7.9 | 53 | 1.0 | 6.5 | 210 | Simultaneous | 3.1 | 3.5 | 0.89 | 10.9 | G | 1.72 | 1.42 | 1.21 | 4.5 | | 4.7 | 0.65 | 300 | G |
| | 14 | Primalloy | 5.0 | 7.9 | 53 | 1.0 | 6.2 | 250 | Simultaneous | 3.0 | 3.3 | 0.91 | 9.9 | G | 1.53 | 1.16 | 1.32 | 3.0 | | 0.7 | 0.63 | 200 | F |
| | 15 | Primalloy | 5.0 | 7.9 | 53 | 1.0 | 6.0 | 180 | Simultaneous | 3.0 | 3.3 | 0.91 | 9.9 | G | 1.75 | 1.38 | 1.27 | 6.5 | | 1.7 | 0.71 | 300 | G |
| | 16 | Primalloy | 5.0 | 7.9 | 53 | 1.0 | 2.8 | 180 | Sequential | 2.8 | 3.5 | 0.80 | 9.8 | F | 1.55 | 1.08 | 1.44 | 4.8 | | 2.7 | 0.72 | 220 | G |
| Comparative Example | 1 | None | | | 53 | 1.0 | 6.2 | 210 | Simultaneous | 3.0 | 3.3 | 0.91 | 9.9 | G | 2.62 | 2.44 | 1.07 | 2.1 | | 17.7 | 0.71 | 360 | G |
| | 2 | None | | | 53 | 1.0 | 2.8 | 180 | Sequential | 2.8 | 3.5 | 0.80 | 9.8 | G | 3.32 | 1.95 | 1.70 | 2.3 | | 18.3 | 0.75 | 300 | G |
| | 3 | Primalloy | 0.5 | 7.9 | 53 | 1.0 | 6.0 | 210 | Simultaneous | 3.0 | 3.3 | 0.91 | 9.9 | G | 2.41 | 2.22 | 1.09 | 2.5 | | 8.3 | 0.69 | 340 | G |
| | 4 | Primalloy | 13.0 | 7.9 | 53 | 1.0 | 6.4 | 210 | Simultaneous | 3.0 | 3.3 | 0.91 | 9.9 | F | 1.21 | 0.78 | 1.55 | 9.8 | | 0.3 | 0.58 | 160 | G |
| | 5 | PEBAX | 5.0 | 7.9 | 53 | 1.0 | 6.0 | 210 | Simultaneous | 3.0 | 3.3 | 0.91 | 9.9 | G | 1.28 | 0.81 | 1.58 | 4.6 | | 7.7 | 0.58 | 180 | G |
| | 6 | PEBAX | 8.0 | 7.9 | 53 | 1.0 | 6.2 | 210 | Simultaneous | 3.0 | 3.3 | 0.91 | 9.9 | G | 1.12 | 0.71 | 1.58 | 11.2 | | 4.3 | 0.52 | 120 | G |
| | 7 | Rexpearl | 5.0 | 7.9 | 53 | 1.0 | 6.2 | 210 | Simultaneous | 3.0 | 3.3 | 0.91 | 9.9 | P | | | | | Not carried out | | | | F |
| | 8 | Primalloy | 5.0 | 7.9 | None | | 0.1 | 210 | Simultaneous | 3.0 | 3.3 | 0.91 | 9.9 | F | 2.71 | 2.56 | 1.06 | 10.3 | | 9.7 | 0.71 | 320 | G |
| | 9 | Primalloy | 5.0 | 7.9 | 53 | 1.0 | 1.2 | 210 | Simultaneous | 3.0 | 3.3 | 0.91 | 9.9 | F | 2.51 | 2.22 | 1.13 | 7.8 | | 5.7 | 0.72 | 320 | P |
| | 10 | Primalloy | 5.0 | 7.9 | 53 | 11.0 | 11.5 | 210 | Simultaneous | 3.0 | 3.3 | 0.91 | 9.9 | F | 1.22 | 0.88 | 1.39 | 4.2 | | 5.3 | 0.60 | 160 | P |
| | 11 | Primalloy | 5.0 | 7.9 | 53 | 1.0 | 6.2 | 160 | Simultaneous | 3.0 | 3.3 | 0.91 | 9.9 | F | 1.83 | 1.60 | 1.14 | 7.5 | | 3.3 | 0.68 | 340 | G |
| | 12 | Primalloy | 5.0 | 7.9 | 53 | 1.0 | 5.9 | 260 | Simultaneous | 3.0 | 3.3 | 0.91 | 9.9 | F | 1.32 | 0.95 | 1.39 | 2.6 | | 6.0 | 0.58 | 160 | P |
| | 13 | Primalloy | 5.0 | 7.9 | 53 | 1.0 | 6.3 | 210 | Simultaneous | 3.0 | 2.3 | 1.30 | 6.9 | G | 1.22 | 0.96 | 1.27 | 3.5 | | 6.0 | 0.71 | 180 | P |
| | 14 | Primalloy | 5.0 | 7.9 | 53 | 1.0 | 5.8 | 210 | Simultaneous | 2.3 | 2.0 | 1.15 | 4.6 | G | 0.95 | 0.91 | 1.04 | 3.3 | | 5.3 | 0.82 | 140 | P |
| | 15 | Primalloy | 5.0 | 7.9 | 53 | 1.0 | 2.6 | 180 | Sequential | 3.0 | 4.0 | 0.75 | 12.0 | G | 2.52 | 1.52 | 1.66 | 8.3 | | 5.7 | 0.62 | 320 | G |

As is evident from Table 1, the polyamide films of Examples 1 to 16 were excellent in flex resistance in a low-temperature environment, also excellent in puncture strength and abrasion resistance, and excellent in pinhole resistance because the content of the polyester thermoplastic elastomer and the production conditions were proper. In addition, these polyamide films had a small haze value and also had excellent transparency.

On the other hand, the films of Comparative Examples 1 and 2 contained no polyester thermoplastic elastomer. The film of Comparative Example 3 had a smaller content of the polyester thermoplastic elastomer than the range defined in the present invention. Therefore, all the films had a higher value of the elastic modulus or the elastic modulus ratio than the range defined in the present invention. Hence, the flex resistance in a low-temperature environment was poor.

The film of Comparative Example 4 had a larger content of the polyester thermoplastic elastomer than the range defined in the present invention. Therefore, the elastic modulus of the film was a value lower than the range defined in the present invention. Hence, the haze value was high, and the transparency was poor. Also, the abrasion resistance was reduced. Furthermore, the travelling unstretched film was wrinkled during moisture percentage adjustment. This destabilized the travelling of the film and reduced operability.

The film of Comparative Example 5 contained an amide thermoplastic elastomer instead of the polyester thermoplastic elastomer and therefore had poor flex resistance in a low-temperature environment, though having favorable transparency. The film of Comparative Example 6 had the content of an amide thermoplastic elastomer of 8.0% by mass and therefore had a high haze value and poor transparency, though having favorable flex resistance in a low-temperature environment. Also, the abrasion resistance of the film was reduced. As is evident from the results of Comparative Examples 5 and 6, the polyamide film containing an amide thermoplastic elastomer was unable to achieve both of flex resistance in a low-temperature environment and transparency.

The film of Comparative Example 7 contained an ethylene copolymer instead of the polyester thermoplastic elastomer. Therefore, the travelling unstretched film was wrinkled during moisture percentage adjustment and non-uniformly stretched, resulting in frequent occurrence of cutting. Thus, the film was unable to be obtained.

The film of Comparative Example 8 did not undergo moisture percentage adjustment. Therefore, the elastic modulus of the film was a value higher than the range defined in the present invention. Hence, the flex resistance in a low-temperature environment was poor. Furthermore, the haze was elevated, and the transparency was reduced.

The film of Comparative Example 9 was produced by stretching the unstretched film having a moisture percentage lower than the range defined in the present invention. Therefore, the elastic modulus of the film was higher than the range defined in the present invention. Hence, the flex resistance in a low-temperature environment was poor. Furthermore, the haze was elevated, and the transparency was reduced.

The film of Comparative Example 10 was obtained in the same way as in Example 1 except that the treatment time of moisture percentage adjustment was changed to 11 minutes. This film was produced by stretching the unstretched film having a moisture percentage higher than the range defined in the present invention. Therefore, the elastic modulus was a value lower than the range defined in the present invention, and the thickness unevenness was also large. Hence, the flex resistance in a low-temperature environment was poor, and the abrasion resistance was also reduced.

The film of Comparative Example 11 was produced under conditions involving a low preheating temperature. Therefore, the haze was elevated, and the transparency was reduced.

The film of Comparative Example 12 was produced under conditions involving a high preheating temperature. The film of Comparative Example 13 had a larger ratio between the stretch ratios (X/Y) than the range defined in the present invention. Therefore, the elastic moduli of both the films were values lower than the ranges defined in the present invention, and the thickness unevennesses were also large. Hence, the flex resistances in a low-temperature environment were poor, and the abrasion resistances were also reduced.

The film of Comparative Example 14 had a smaller TD stretch ratio (Y) than the range defined in the present invention. Therefore, the elastic modulus of the film was a value lower than the range defined in the present invention, and the thickness unevenness was also large. Hence, the flex resistance in a low-temperature environment was poor, and the abrasion resistance was also reduced.

The film of Comparative Example 15 had a larger TD stretch ratio (Y) than the range defined in the present invention, and a smaller ratio between the stretch ratios (X/Y) than the range defined in the present invention. Therefore, the elastic modulus and the elastic modulus ratio were values exceeding the range defined in the present invention. Hence, the flex resistance in a low-temperature environment was poor. Furthermore, the haze was high, and the transparency was reduced.

Example 17

An unstretched film having a thickness of 250 μm was obtained in the same way as in Example 1.

Next, this unstretched film was led to a water tank set to pH 7.9 and a temperature of 53° C. for moisture percentage adjustment, and dipped in water for 1 minute.

Next, a PVDC latex (Saran Latex L536B manufactured by Asahi Kasei Corp. (solid content concentration: 49% by mass)) was applied by an air knife coating method to one surface of the unstretched film allowed to absorb water, and subjected to drying treatment for 30 seconds using an infrared irradiation machine having a temperature of 110° C. to evaporate moisture in the latex to dryness.

This latex-coated unstretched film dried to remove moisture from the latex (moisture percentage: 5.8% by mass) was led to a simultaneous biaxial stretching machine and simultaneously biaxially stretched at a MD stretch ratio (X) of 3.0 and a TD stretch ratio (Y) of 3.3. Subsequently, the film was heat-treated at a temperature of 210° C., followed by 5% relaxation treatment in the lateral direction to obtain a polyamide laminate film having a polyamide film thickness of 25 μm and a PVDC layer thickness of 1.5 μm after stretching.

Examples 18 to 27 and Comparative Examples 16 to 21

Each polyamide laminate film was obtained in the same way as in Example 17 except that the thickness of the PVDC layer, the content of the polyester thermoplastic elastomer, the type of the PVDC latex, and the production conditions were changed to values shown in Tables 2 and 3.

The configurations, production conditions, and evaluation results of the polyamide laminate films obtained in Examples 17 to 27 and Comparative Examples 16 to 21 are shown in Tables 2 and 3.

TABLE 2

| | | Elastomer of polyamide resin composition | | Moisture percentage adjustment | | | Type of PVDC latex | Moisture percentage of film before stretching (% by mass) | Pre-heating temperature (° C.) | Stretching method | Sretch ratio | | | |
|---|---|---|---|---|---|---|---|---|---|---|---|---|---|---|
| | | | | | | | | | | | X (MD) | Y (TD) | X/Y | X × Y |
| | | Type | Content (% by mass) | pH | Temperature (° C.) | Time (min) | | | | | | | | |
| Example | 17 | Primalloy | 5.0 | 7.9 | 53 | 1.0 | L536B | 5.8 | 220 | Simultaneous | 3.0 | 3.3 | 0.91 | 9.9 |
| | 18 | Primalloy | 5.0 | 7.9 | 53 | 1.0 | L536B | 6.0 | 220 | Simultaneous | 3.0 | 3.3 | 0.91 | 9.9 |
| | 19 | Primalloy | 5.0 | 7.9 | 53 | 1.0 | L536B | 5.5 | 220 | Simultaneous | 3.0 | 3.3 | 0.91 | 9.9 |
| | 20 | Primalloy | 8.0 | 7.9 | 53 | 1.0 | L529B | 5.3 | 220 | Simultaneous | 3.0 | 3.3 | 0.91 | 9.9 |
| | 21 | Primalloy | 1.5 | 7.9 | 53 | 1.0 | L529B | 6.2 | 220 | Simultaneous | 3.0 | 3.3 | 0.91 | 9.9 |
| | 22 | Primalloy | 5.0 | 8.5 | 68 | 8.0 | L536B | 8.8 | 220 | Simultaneous | 3.0 | 3.3 | 0.91 | 9.9 |
| | 23 | Primalloy | 5.0 | 6.8 | 30 | 3.0 | L536B | 2.5 | 220 | Simultaneous | 3.0 | 3.3 | 0.91 | 9.9 |
| | 24 | Primalloy | 5.0 | 7.9 | 53 | 1.0 | L536B | 6.2 | 240 | Simultaneous | 3.0 | 3.3 | 0.91 | 9.9 |
| | 25 | Primalloy | 5.0 | 7.9 | 53 | 1.0 | L536B | 5.6 | 200 | Simultaneous | 3.0 | 3.3 | 0.91 | 9.9 |
| | 26 | Primalloy | 5.0 | 7.9 | 53 | 1.0 | L536B | 6.0 | 220 | Simultaneous | 2.7 | 3.3 | 0.82 | 8.9 |
| | 27 | Primalloy | 5.0 | 7.9 | 53 | 1.0 | L536B | 6.0 | 220 | Simultaneous | 3.5 | 3.0 | 1.17 | 10.5 |
| Comparative Example | 16 | None | | 7.9 | 53 | 1.0 | L536B | 6.2 | 220 | Simultaneous | 3.0 | 3.3 | 0.91 | 9.9 |
| | 17 | Primalloy | 12.0 | 7.9 | 53 | 1.0 | L536B | 5.3 | 220 | Simultaneous | 3.0 | 3.3 | 0.91 | 9.9 |
| | 18 | Primalloy | 5.0 | 7.9 | 53 | 1.0 | L536B | 5.8 | 160 | Simultaneous | 3.0 | 3.3 | 0.91 | 9.9 |
| | 19 | Primalloy | 5.0 | 7.9 | 53 | 1.0 | L536B | 6.0 | 260 | Simultaneous | 3.0 | 3.3 | 0.91 | 9.9 |
| | 20 | Pnmalloy | 5.0 | 7.9 | 53 | 1.0 | L536B | 6.2 | 220 | Simultaneous | 4.2 | 3.3 | 1.27 | 13.9 |
| | 21 | Primalloy | 5.0 | 7.9 | 53 | 1.0 | L536B | 5.5 | 220 | Simultaneous | 2.0 | 4.0 | 0.50 | 8.0 |

TABLE 3

| | | Characteristics of polyamide laminate film | | | | | | | | | | |
|---|---|---|---|---|---|---|---|---|---|---|---|---|
| | | Operability | Elastic modulus (GPa) | | | Haze (%) | Pinhole resistance (5° C., 65% RH) Flex resistance (the number of pinholes) | Puncture strength (N/μm) | Abrasion resistance (times) | Thickness unevenness | PVDC layer thickness (μm) | Oxygen permeability (ml/(m² · d · MPa)) | Adhesion strength (N/cm) |
| | | | MD | TD | MD/TD | | | | | | | | |
| Example | 17 | G | 1.67 | 1.32 | 1.27 | 2.8 | 1.0 | 0.68 | 280 | G | 1.5 | 73 | 2.02 |
| | 18 | G | 1.68 | 1.31 | 1.28 | 2.6 | 0.7 | 0.70 | 260 | G | 0.7 | 90 | 2.10 |
| | 19 | G | 1.65 | 1.30 | 1.27 | 3.2 | 3.0 | 0.68 | 280 | G | 3.3 | 48 | 1.88 |
| | 20 | G | 1.45 | 1.10 | 1.32 | 4.3 | 0.3 | 0.65 | 220 | G | 1.5 | 102 | 1.23 |
| | 21 | G | 2.05 | 1.85 | 1.11 | 2.5 | 3.7 | 0.68 | 340 | G | 1.5 | 98 | 2.72 |
| | 22 | G | 1.40 | 1.05 | 1.33 | 2.3 | 0.7 | 0.67 | 300 | G | 1.5 | 78 | 1.78 |
| | 23 | G | 2.05 | 1.80 | 1.14 | 6.8 | 4.0 | 0.69 | 300 | G | 1.5 | 81 | 1.08 |
| | 24 | G | 1.55 | 1.13 | 1.37 | 2.8 | 1.0 | 0.65 | 260 | G | 1.5 | 65 | 1.90 |
| | 25 | G | 1.81 | 1.42 | 1.27 | 6.3 | 2.3 | 0.70 | 300 | G | 1.5 | 92 | 2.08 |
| | 26 | G | 1.50 | 1.31 | 1.15 | 3.3 | 1.0 | 0.64 | 240 | G | 1.5 | 78 | 1.95 |
| | 27 | G | 180 | 1.22 | 1.48 | 5.7 | 2.0 | 0.70 | 280 | G | 1.5 | 75 | 2.00 |
| Comparative Example | 16 | G | 2.60 | 2.40 | 1.08 | 2.1 | 21.3 | 0.71 | 380 | G | 1.5 | 74 | 1.80 |
| | 17 | F | 1.30 | 0.85 | 1.53 | 11.3 | 0.7 | 0.60 | 180 | G | 1.5 | 77 | 0.78 |
| | 18 | F | 1.83 | 1.60 | 1.14 | 7.5 | 3.3 | 0.68 | 320 | G | 1.5 | 103 | 1.93 |
| | 19 | F | 1.32 | 0.95 | 1.39 | 2.6 | 5.3 | 058 | 160 | P | 1.5 | 63 | 1.88 |
| | 20 | F | 2.45 | 2.12 | 1.16 | 6.4 | 8.3 | 0.62 | 320 | P | 1.5 | 85 | 2.00 |
| | 21 | F | 0.95 | 1.63 | 0.58 | 5.2 | 6.3 | 0.72 | 180 | P | 1.5 | 88 | 1.98 |

As is evident from Tables 2 and 3, the polyamide films of Examples 17 to 27 were excellent in flex resistance in a low-temperature environment, also excellent in puncture strength and abrasion resistance, and excellent in pinhole resistance because the content of the polyester thermoplastic elastomer and the production conditions were proper. In addition, these polyamide films had a small haze value and also had excellent transparency. Furthermore, the films were excellent in adhesion strength between the polyamide film and the PVDC layer and also excellent in gas barrier properties.

The laminate film of Comparative Example 16 had a higher value of the elastic modulus than the range defined in the present invention because the polyamide film contained no polyester thermoplastic elastomer. Hence, the flex resistance in a low-temperature environment was poor.

The laminate film of Comparative Example 17 had a lower value of the elastic modulus than the range defined in the present invention because the content of the polyester thermoplastic elastomer in the polyamide film was larger than the range defined in the present invention. Hence, the film had a high haze and poor transparency. Furthermore, the abrasion resistance was also reduced, and the adhesion strength between the PVDC layer and the polyamide film was also reduced.

The laminate film of Comparative Example 18 had a high haze and poor transparency because the film was produced under conditions involving a low preheating temperature.

The laminate film of Comparative Example 19 had a lower value of the elastic modulus than the range defined in the present invention and also large thickness unevenness because the film was produced under conditions involving a high preheating temperature. Hence, the flex resistance in a low-temperature environment was poor, and the abrasion resistance was also reduced.

The laminate film of Comparative Example 20 had a value of the elastic modulus exceeding the range defined in the present invention and poor flex resistance in a low-temperature environment because both the MD stretch ratio (X) and the ratio between the stretch ratios (X/Y) were larger than the range defined in the present invention.

The laminate film of Comparative Example 21 had an elastic modulus and an elastic modulus ratio lower than the ranges defined in the present invention because the ratio between the stretch ratios (X/Y) was smaller than the range defined in the present invention. Hence, the flex resistance in a low-temperature environment was poor, and the abrasion resistance was also poor.

The invention claimed is:

1. A polyamide film which is a stretched film comprising a polyamide resin composition containing 1 to 10% by mass of a polyester thermoplastic elastomer constituted by a polymer segment including an aliphatic polyether unit, wherein the polyamide film consists of a polyamide resin layer and the polyamide resin layer of the polyamide film is a single-layer configuration and the polyamide film satisfies all of the following conditions (A) to (D):
   (A) elastic moduli in MD and TD of the film are each 1.0 to 2.3 GPa;
   (B) a ratio between the elastic moduli in MD and TD of the film (MD/TD) is 0.9 to 1.5;
   (C) a haze of the film is 7% or less; and
   (D) a thickness of the film is 10 to 50 µm.

2. The polyamide film according to claim 1, wherein the number of pinholes in a 1000-repetition flex fatigue test at 5° C. in a 65% RH atmosphere is 5/500 cm$^2$ or less.

3. A polyamide laminate film comprising a polyamide film according to claim 1 and a polyvinylidene chloride resin layer on at least one surface of the polyamide film.

4. A method for producing a polyamide film according to claim 1, comprising in order:
   (a) allowing an unstretched film comprising a polyamide resin composition containing a polyester thermoplastic elastomer to absorb water such that a moisture percentage is 2 to 10%; and
   (b) biaxially stretching the unstretched film allowed to absorb water such that a MD stretch ratio (X) and a TD stretch ratio (Y) each range from 2.2 to 3.8 and a ratio between the stretch ratios (X/Y) is 0.8 to 1.2.

5. The method for producing a polyamide film according to claim 4, wherein the unstretched film allowed to absorb water is biaxially stretched after preheating at 180 to 250° C.

6. A polyamide laminate film comprising a polyamide film according to claim 2 and a polyvinylidene chloride resin layer on at least one surface of the polyamide film.

7. A method for producing a polyamide film according to claim 2, comprising in order:
   (a) allowing an unstretched film comprising a polyamide resin composition containing a polyester thermoplastic elastomer to absorb water such that a moisture percentage is 2 to 10%; and
   (b) biaxially stretching the unstretched film allowed to absorb water such that a MD stretch ratio (X) and a TD stretch ratio (Y) each range from 2.2 to 3.8 and a ratio between the stretch ratios (X/Y) is 0.8 to 1.2.

8. The method for producing a polyamide film according to claim 7, wherein the unstretched film allowed to absorb water is biaxially stretched after preheating at 180 to 250° C.

* * * * *